(12) United States Patent
Partee et al.

(10) Patent No.: US 10,345,631 B1
(45) Date of Patent: Jul. 9, 2019

(54) SOLID STATE SPATIAL LIGHT MODULATOR

(71) Applicant: Steel City Optronics, LLC, Lyons, CO (US)

(72) Inventors: Charles Partee, Lyons, CO (US); Sara Partee, Gibsonia, PA (US)

(73) Assignee: Steel City Optronics, LLC, Lyons, CO (US)

( * ) Notice: Subject to any disclaimer, the term of this patent is extended or adjusted under 35 U.S.C. 154(b) by 35 days.

(21) Appl. No.: 15/265,830

(22) Filed: Sep. 14, 2016

Related U.S. Application Data

(60) Provisional application No. 62/283,892, filed on Sep. 15, 2015.

(51) Int. Cl.
*G02F 1/09* (2006.01)
*G02F 1/01* (2006.01)

(52) U.S. Cl.
CPC ............ *G02F 1/092* (2013.01); *G02F 1/0102* (2013.01); *G02F 1/0136* (2013.01)

(58) Field of Classification Search
CPC . G02F 1/09; G02F 1/093; G02F 1/092; G02F 1/0102; G02F 1/0136; G02F 1/0036; G02F 1/23; G02B 27/283; G02B 5/3083
USPC ......... 359/280–282, 484.01, 484.02, 484.03, 359/484.06, 484.1, 324; 365/122
See application file for complete search history.

(56) References Cited

U.S. PATENT DOCUMENTS

| | | | |
|---|---|---|---|
| 4,495,492 A | 1/1985 | Anderson et al. | |
| 4,497,545 A | 2/1985 | Ross | |
| 4,550,389 A | 10/1985 | Cox et al. | |
| 4,550,983 A | 11/1985 | Ross | |
| 4,563,236 A | 1/1986 | Ross et al. | |
| 4,578,321 A | 3/1986 | Ross et al. | |

(Continued)

OTHER PUBLICATIONS

Babacan, et al., Compressive Passive Millimeter-Wave Imaging, 2011 18th IEEE Conference on Imaging. A publication month is not of issue since publication at any time in 2011 is sufficiently early.

(Continued)

*Primary Examiner* — Jie Lei

(74) *Attorney, Agent, or Firm* — Pritzkau Patent Group, LLC

(57) ABSTRACT

A spatial light modulator includes an array of Faraday domains with each Faraday domain being selectively magnetizable to serve as an individual magnetic domain for selectively changing a polarization state of electromagnetic waves, having wavelengths that are no greater than a maximum wavelength, passing through each Faraday domain with each Faraday domain being characterized by physical dimensions and each Faraday domain is selectively magnetizable so long as the physical dimensions do not exceed a given maximum set of dimensions that correspond to the maximum wavelength. An addressing arrangement addresses the array of Faraday domains to selectively switch a magnetization state of a group of adjacent ones of the Faraday domains such that the Faraday domains that make up the group of Faraday domains cooperate to selectively change the polarization state of at least one electromagnetic wave passing therethrough having a wavelength that is longer than the maximum wavelength.

13 Claims, 4 Drawing Sheets

(56) References Cited

U.S. PATENT DOCUMENTS

| | | | | |
|---|---|---|---|---|
| 4,661,809 A * | 4/1987 | Anderson | ................. | G02F 1/09 |
| | | | | 345/695 |
| 6,876,481 B2 * | 4/2005 | Inoue | ....................... | G02F 1/09 |
| | | | | 359/250 |
| 8,855,431 B2 | 10/2014 | Donoho | | |
| 8,941,431 B2 | 1/2015 | Granhaug et al. | | |

OTHER PUBLICATIONS

Heidari, et al., A 2D Camera Design with a Single-pixel Detector, 2009 34th International Conference on Infrared, Millimeter, and Terahertz Waves. A publication month is not of issue since publication at any time in 2009 is sufficiently early.

Spinoulas, et al., Optimized compressive sampling for passive millimeter-wave imaging, published Sep. 7, 2012.

Uzi Efron, Spatial Light Modulator Technology Materials, Devices and Applications; pp. 361-371, copyright 1995.

\* cited by examiner

SOLID STATE SPATIAL LIGHT MODULATOR

RELATED APPLICATION

The present application claims priority to U.S. Provisional Patent Application No. 62/283,892 filed on Sep. 14, 2015, which is hereby incorporated by reference in its entirety.

BACKGROUND

The present invention is generally related to the field of the modulation of light and, more particularly, to an advanced spatial light modulator and associated methods as well its application to imaging, including but not limited to, millimeter wave imaging.

Applicants recognize that it is well known in the art to use a spatial light modulator, or SLM, in an imaging application. Frequently, the SLM used is magneto-optic, in which magnetic fields change a property of a material affecting its interaction with electromagnetic waves. One example of such materials are Faraday materials which can alter the polarization of electromagnetic waves passing therethrough, and which in response to the magnetic field in the material, can change the amount of alteration. One example of a prior art magneto-optic SLM is taught in Cox, et. al, U.S. Pat. No. 4,550,389 (hereinafter Cox) which is incorporated by reference. Cox describes an SLM suitable for imaging application as an array of magnetic domain elements, with running wires along the columns and rows. Running currents through those wires, and possibly others, can determine the magnetization of each element. Passing electromagnetic waves through such an SLM, as well as through some additional optical elements such as, for example, polarizers, allow the SLM to modulate the intensity of the light and form an image.

Applicants further recognize that published designs have attempted to apply the technique of compressive sampling and a single imaging sensor in order to achieve higher resolution than is possible with a single sensor alone. This approach has been used in cases where the imaging sensor is of a specialty type and/or comparatively expensive and it is not desirable to create an N×N matrix of imaging sensors (i.e., pixels) to generate an image with N×N resolution. In one example, millimeter wave sensors are expensive and a multi-pixel millimeter wave sensor array can cost hundreds of thousands of dollars.

Applicants still further appreciate that compressive sampling requires that a series of blocking patterns, such as, for example, Hadamard patterns, be generated. In the visible light regime, these patterns are commonly generated by solid-state spatial light modulators, such as, for example, LCDs, or nearly solid-state spatial light modulators, such as, for example, micro-mirror arrays. Additionally, millimeter wave imaging systems utilizing compressive sampling and a single-pixel sensor have been attempted. However, in these demonstrations, the series of Hadamard (or other) blocking patterns have been generated using a series of individual physical masks because solid-state spatial millimeter wave modulators are not available. In these designs, therefore, the mask must be physically moved in front of the sensor. In one embodiment, for example, a mask is placed in front of the sensor, the image captured, the mask removed, and then the next mask placed in turn, the image captured, and so forth, generating the series of images that can be used to mathematically convolve the final image.

The foregoing examples of the related art and limitations related therewith are intended to be illustrative and not exclusive. Other limitations of the related art may become apparent to those of ordinary skill in the art upon a reading of the specification and a study of the drawings.

SUMMARY

The following embodiments and aspects thereof are described and illustrated in conjunction with systems, tools, and methods which are meant to be exemplary and illustrative, not limiting in scope. In various embodiments, one or more of the above described problems have been reduced or eliminated.

In general, a spatial light modulator, associated system and methods are described. In one embodiment an array of Faraday domains is implemented with each Faraday domain being selectively magnetizable to serve as an individual magnetic domain for selectively changing a polarization state of electromagnetic waves, having wavelengths that are no greater than a maximum wavelength, passing through each magnetic domain with each Faraday domain being characterized by physical dimensions and each Faraday domain is selectively magnetizable so long as the physical dimensions do not exceed a given maximum set of dimensions which allow each Faraday domain to serve as the individual magnetic domain and which given maximum set of dimensions correspond to the maximum wavelength. An addressing arrangement addresses the array of Faraday domains and is configured to selectively switch a magnetization state of a group of adjacent ones of the Faraday domains such that the Faraday domains that make up the group of Faraday domains cooperate to selectively change the polarization state of at least one electromagnetic wave passing therethrough having a wavelength that is longer than the maximum wavelength.

BRIEF DESCRIPTION OF THE DRAWINGS

Example embodiments are illustrated in referenced figures of the drawings. It is intended that the embodiments and figures disclosed herein are to be illustrative rather than limiting.

DETAILED DESCRIPTION

Figure 1:
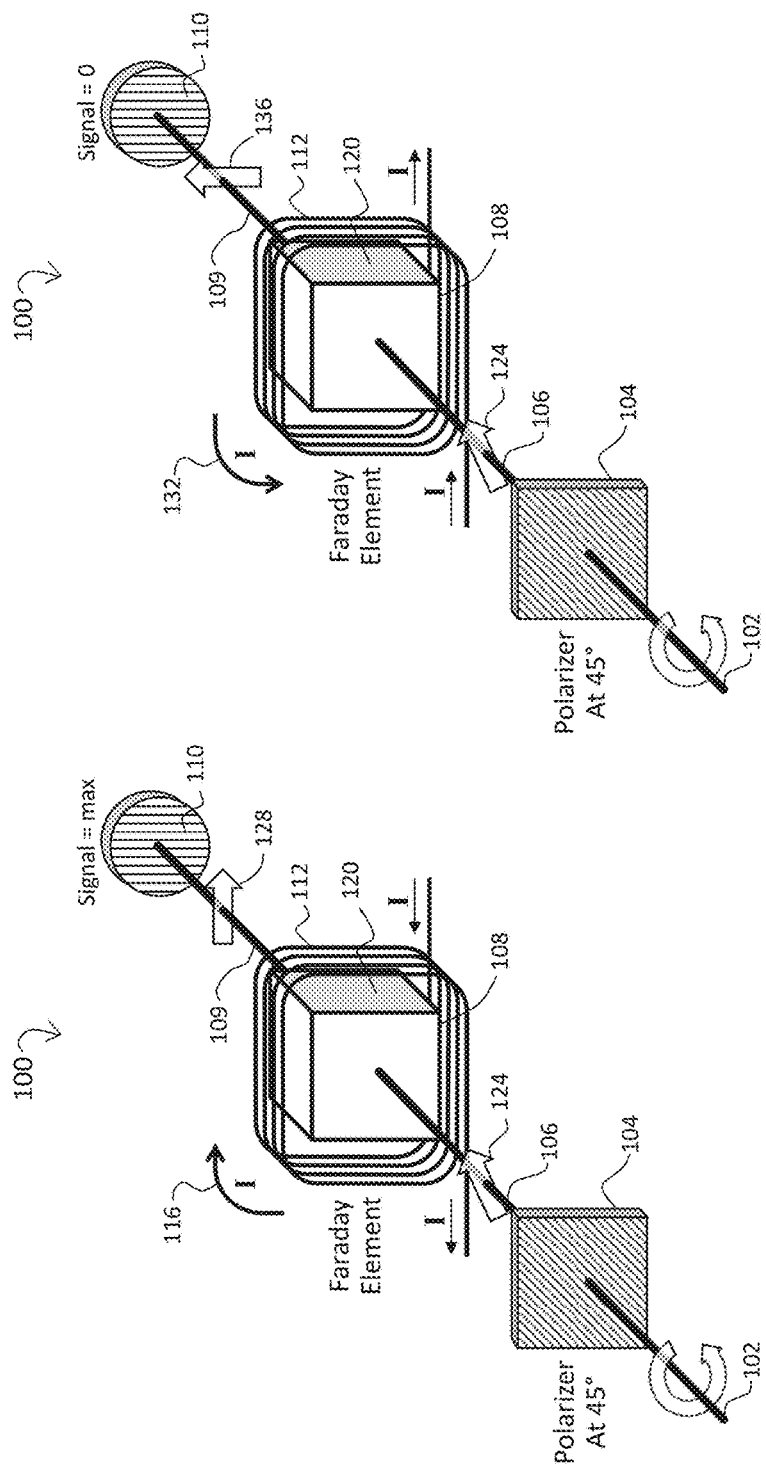
FIGS. 1a and 1b are diagrammatic views, in perspective, depicting the operation of a Faraday material in accordance with the prior art.

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents, as defined within the scope of the appended claims.

Applicants hereby describe a magneto-optic spatial light modulator. Embodiments of this spatial light modulator (SLM) support compressive sampling and imaging systems that operate with electromagnetic waves (EMW) over a range of frequencies from 10 GHz to 10 THz (millimeter wave to terahertz spectrum), as well as over a range of frequencies from 30 GHz to 300 GHz (millimeter wave). An embodiment of this spatial light modulator used in conjunction with a compressive sampling algorithm comprises a millimeter wave imaging camera. Such a camera offers sweeping improvements over the state-of-the-art in millimeter wave imaging.

Embodiments of the spatial light modulator (SLM) disclosed herein use the Faraday effect. As discussed earlier, Faraday rotators are widely known in the art and are commonly used to modulate the amplitude of electromagnetic waves (EMW). Faraday rotators are also widely used in telecommunications and laser applications. In the Faraday effect, the direction of the EMW rotation depends on the dot product of the EMW propagation vector and the magnetic flux; that is, the polarization rotation of the EMW can be reversed by either changing the field direction or the wave direction, therefore, a Faraday material can rotate the polarization of the incoming EMW in one direction or another. The magnetization direction of the material can be controlled, such as with an applied external magnetic field which, in turn, can be determined, for example, by the direction and magnitude of an electrical current around the Faraday material. In one embodiment, the Faraday material and dimensions are chosen to rotate the polarization of the EMW approximately +45° or −45° by changing the direction of the magnetization in the material. In other embodiments, design considerations may result in more or less polarization rotation, with an accompanying loss in SNR (Signal to Noise Ratio). The magnetization direction of the material can be controlled with an external magnetic field, which can determined by the direction and magnitude of the electrical current.

Turning now to the drawings, it is noted that the figures are not to scale and are diagrammatic in nature in a way that is thought to best illustrate features of interest. Descriptive terminology may be adopted with respect to the various views provided in the figures for purposes of enhancing the reader's understanding and is in no way intended to be limiting. It is noted that like reference numbers may be used to refer to like items throughout the various figures.

Attention is now directed to FIGS. 1a and 1b, both of which diagrammatically illustrate a system generally indicated by the reference number 100 that can form at least a portion of a spatial light modulator. Input EMW 102 is passed through an initial polarizer 104. Input EMW may be of known or unknown polarization and may be polarized, unpolarized, or partially polarized. For purposes of illustration and not limitation, input EMW is depicted as circularly polarized in the figure. Leaving the polarizer, the resulting EMW is now of known polarization. Polarized EMW 106 is then passed through a Faraday element 108 becoming outgoing EMW 109, which is allowed to enter a polarized detector 110. It is noted that the terms polarized detector and polarization analyzer may be used interchangeably in the present disclosure. Faraday element 108 is surrounded by a conductor or coil 112, through which selectively carries a current I.

Focusing now on FIG. 1a, when current I is passed through conductor 112 in a clockwise fashion, as indicated by an arrow 116, the applied magnetic field will be into the plane of the paper and hence a Faraday material 120 in Faraday element 108 will be magnetized into the plane of the paper. Input EMW 102 is polarized by polarizer 104 becoming incoming EMW 106, which is polarized in incoming direction 124. Incoming EMW 106 impinges upon Faraday material 120 in Faraday element 108 such that the polarization of outgoing EMW 109 is rotated to an outgoing direction 128, and polarization analyzer 110 blocks the passage of the wave to produce a maximum output signal.

On the other hand, in FIG. 1b, when current I is passed through conductor 112 in a counterclockwise direction, as indicated by an arrow 132, the applied magnetic field will be out of the plane of the paper and hence the Faraday material 120 in Faraday element 108 will be magnetized out of the plane of the paper and the polarization of alternate outgoing EMW 109 will be rotated to an alternate direction 136 such that polarized detector 110 allows the passage of the EMW to produce a minimum output signal.

Any material with a non-zero Verdet constant that is sufficiently transmissive at a frequency of interest can be used as Faraday material 120. By way of illustration, and without limitation, garnet materials can be chosen since the material properties can be modified by adding dopants to control their properties, such as Verdet constant, magnetostriction, magnetic moment, among others. In one embodiment, yttrium iron garnet can be utilized. In another embodiment, gadolinium iron garnet can be utilized. In still another embodiment, bismuth-doped gadolinium iron garnet can be utilized.

An array of Faraday elements 108 is suitable for use in a spatial light modulator. As will be discussed below, there are advantages to Faraday elements 108 being comprised of a primarily single domain of Faraday material 120. Faraday elements that are so comprised are henceforth referred to as Faraday domains. An array of these Faraday domains, that can be individually selected, allows the selected Faraday domains to be selectively magnetized in first and second directions that differ by 90 degrees. As previously discussed, this causes the polarized incoming EMW 106 passing through the selected Faraday material to be variably rotated in one direction or the other, thereby causing the rotated outgoing EMW 109 to be variably absorbed or transmitted by polarization analyzer 110.

Figure 2:
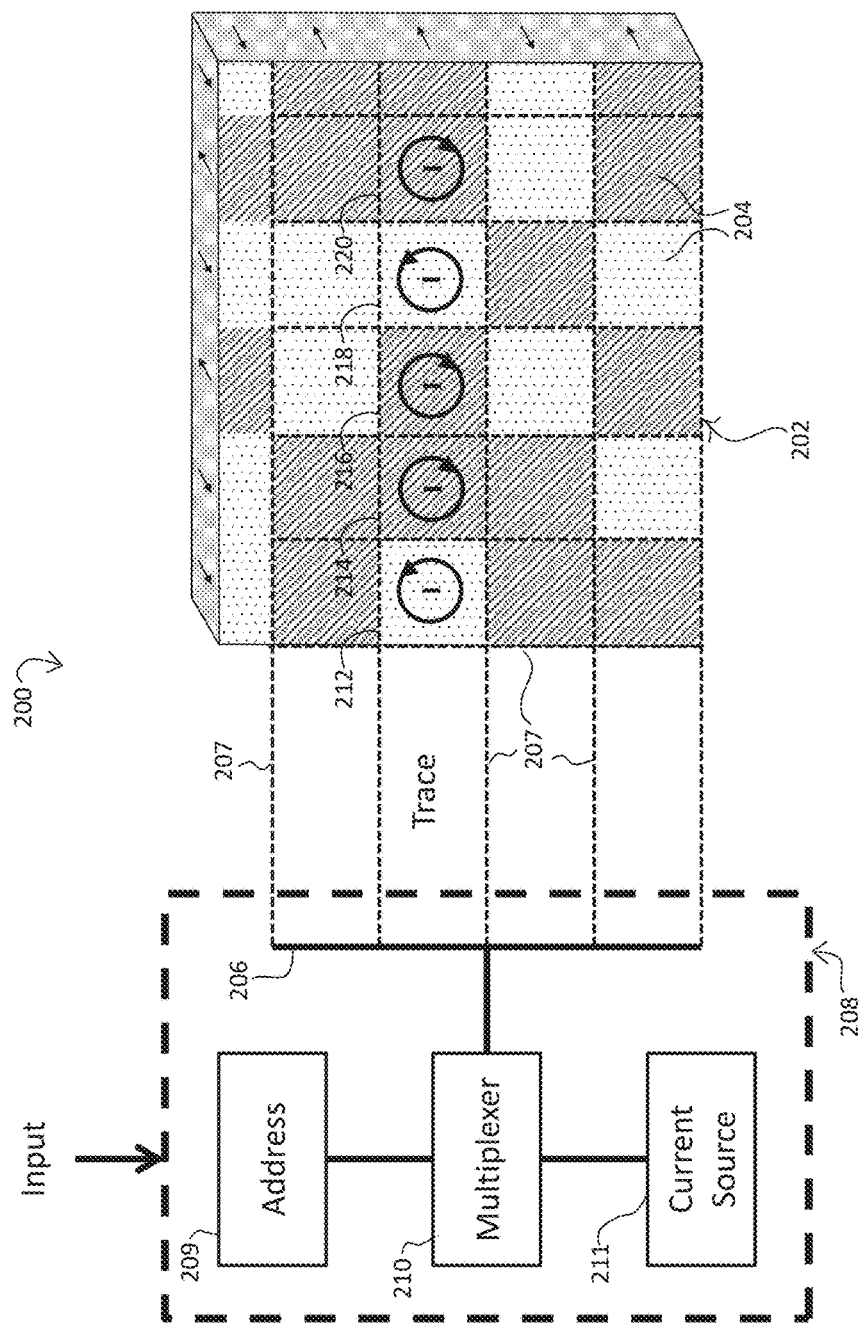
FIG. 2 is a diagrammatic plan view that illustrates a spatial light modulator implemented in accordance with the present disclosure including a control arrangement and a Faraday domain array.

Attention is now directed to FIG. 2, which diagrammatically illustrates a spatial light modulator, generally indicated by the reference number 200, and produced in accordance with the present disclosure. Modulator 200 includes an array 202 of Faraday domains 204. Each Faraday domain can be configured in a manner that is consistent with that of the Cox patent using addressing lines 206 that lead through traces 207 to each Faraday domain. The spatial light modulator further includes an addressing arrangement 208 that is shown within a dashed rectangle for selectively addressing the Faraday domains on addressing lines 206 to control and set the magnetization state of each Faraday domain. Addressing arrangement further includes an addresser 209, a multiplexer 210 and a current source 211. In order to address one Faraday domain, addresser 209 receives an array address on an Input line for that Faraday domain and drives multiplexer 210 to select that address on lines 206. Multiplexer 210 then connects current source 211, on the appropriate addressing lines 206 and traces 207, to the selected Faraday domain to set that Faraday domain to the desired magnetization state.

With continuing reference to FIG. 2, five specific examples of Faraday domains 204 within array 202 are designated by the reference numbers 212, 214, 216, 218, and 220. Traces 207 form part of the addressing arrangement and surround each Faraday domain to allow regions of Faraday material 120 (FIGS. 1a and 1b) within that Faraday domain to be selectively magnetized in one direction or the other/alternate direction by addressing arrangement 208. In the description that follows, the reader should keep in mind the previous discussion with regard FIGS. 1a and 1b. The operation of a selected one of the Faraday domains is consistent with Faraday element 108 illustrated in FIGS. 1a and 1b.

Still referring to FIG. 2, it is initially noted that shading of each Faraday domain is used to illustrate the magnetic state of that Faraday element, wherein a dot pattern indicates one state and a cross-hatch pattern indicates an alternate state. When a current is passed through traces 207 in a clockwise fashion around a selected one or more of the Faraday domains in array 202, as depicted by Faraday domains 214, 216 and 220, the applied magnetic field is into the plane of the paper and hence the Faraday domains addressed through traces 207 are magnetized into the plane of the figure. The polarization of the incoming EMW 106 (not shown) will be rotated in one direction, and polarization analyzer 110 (see FIGS. 1a and 1b) will block the passage of the outgoing EMW 109. On the other hand, when the current through traces 207 around the selected one or more of the Faraday domains is passed in the counter-clockwise direction, as depicted, for example, by Faraday domains 212 and 218, the applied magnetic field is out of the plane of the paper and hence Faraday domains 212 and 218 are magnetized out of the plane of the paper, the polarization of the incoming EMW 106 are rotated in the alternate direction, and polarization analyzer 110 will allow the passage of outgoing EMW 109. As will be discussed, Applicants recognize that selectively blocking or transmitting EMW in a given region defined by the Faraday domains can create blocking patterns that are required for compressive sampling.

Figure 3:
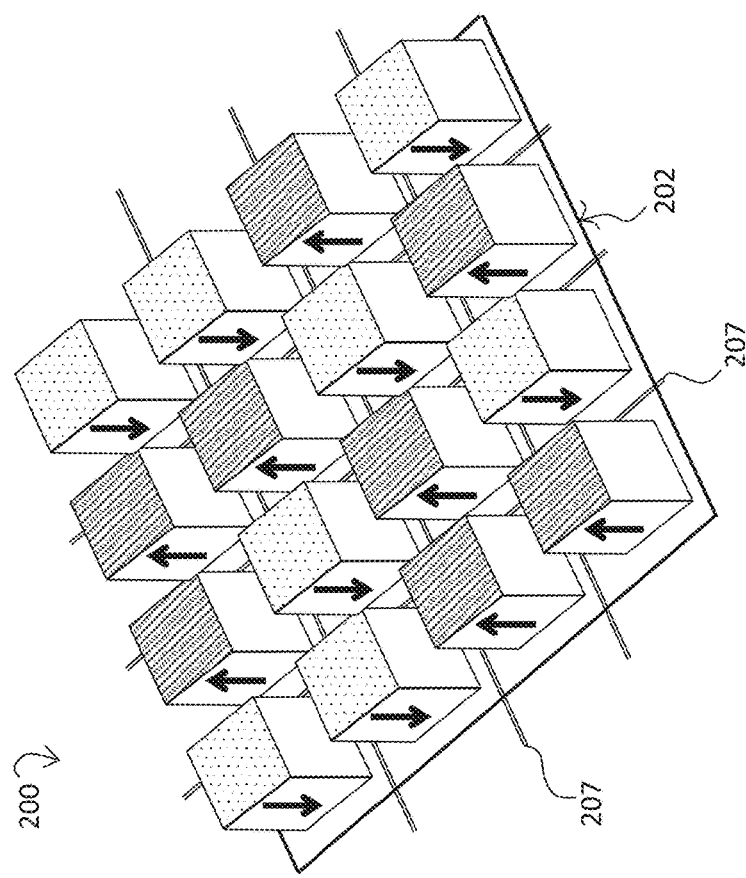
FIG. 3 is a diagrammatic view, in perspective, illustrating a spatial light modulator with an array of magnetic domain elements programmed in a pattern.

Attention is now directed to FIG. 3 in which a diagrammatic, partial perspective view of spatial light modulator 200 is presented which illustrates array of Faraday domains 202 and traces 207 (several of which are individually designated). The magnetization state of individual Faraday domains is indicated using solid black for one state and a dot pattern for the alternate state. Thus, the array of Faraday domains has been set to define a pattern in FIG. 3 which can be used as an individual pattern for compressive sampling. Applicants recognize that compressive sampling algorithms are more readily implemented if the Faraday domains are uniformly transmissive or uniformly absorptive. Since the degree of Faraday rotation is proportional to the magnetic flux, the requirement that each Faraday domain have generally uniform transmission or uniform absorption corresponds to requiring at least generally uniform flux therethrough. Accordingly, each Faraday domain is addressable with traces 207 that run beside each element and apply the external magnetic field. The array elements are carefully sized so that each element is a single stable magnetic domain that retains its magnetization moment and direction after the external magnetic field is removed. Because there is no external field, the flux is determined by the magnetization only. This provides a generally uniform flux in each domain and therefore a generally uniform Faraday rotation. In this design, each array element is a single domain and each domain comprises one array element. Applicants appreciate that there may be variation in the magnetization near the walls and surfaces of the array element and that the walls of the magnetic domain may not completely align with the boundaries of the array element. As part of this sizing, Applicants recognize that some portion of the incident EMW will also fall on the traces of the addressing arrangement. Accordingly, it is of benefit to reduce the area of the traces for reasons which will be made evident in the context of another embodiment.

Applicants recognize that in compressive sampling imaging systems produced in accordance with the present disclosure, the EMW wavelength of interest is generally related to the size of Faraday domain. Thus, longer wavelength EMWs generally correspond to larger Faraday domains. It is submitted, however, that the prior has failed to recognize that there is a limitation regarding merely increasing the size of Faraday elements to accommodate longer wavelengths. At some point, larger domains/elements, for example, as described by the Cox patent, are no longer magnetically stable without an external field and spontaneously demagnetize. This sets a problematic upper bound on the wavelength that can be supported by the Cox patent. It is noted that the present disclosure sweeps aside this concern, as will be described immediately hereinafter.

In accordance with the present disclosure, an embodiment of a spatial light modulator utilizes a group of adjacent individually magnetically stable domains all oriented in the same direction to form an array cell of arbitrary size, which then allows Applicants to support larger wavelengths. For example, if the Faraday material can support a stable 50×50 micron single domain, then the Cox patent would have a maximum of a 50×50 micron array element, therefore imposing a maximum wavelength restriction. In Applicants' approach, the size of an array element is effectively increased by using more domains. For example, a grouping of 50×50 micron single domains in the form of a 10×10 array is 500 microns by 500 microns, thereby allowing Applicants to use the spatial light modulator on longer wavelengths. Applicants further recognize that the traces that run between the domains can be made small enough that the traces do not block these larger wavelengths appreciably, although some portion of the EMW is blocked.

Figure 4:
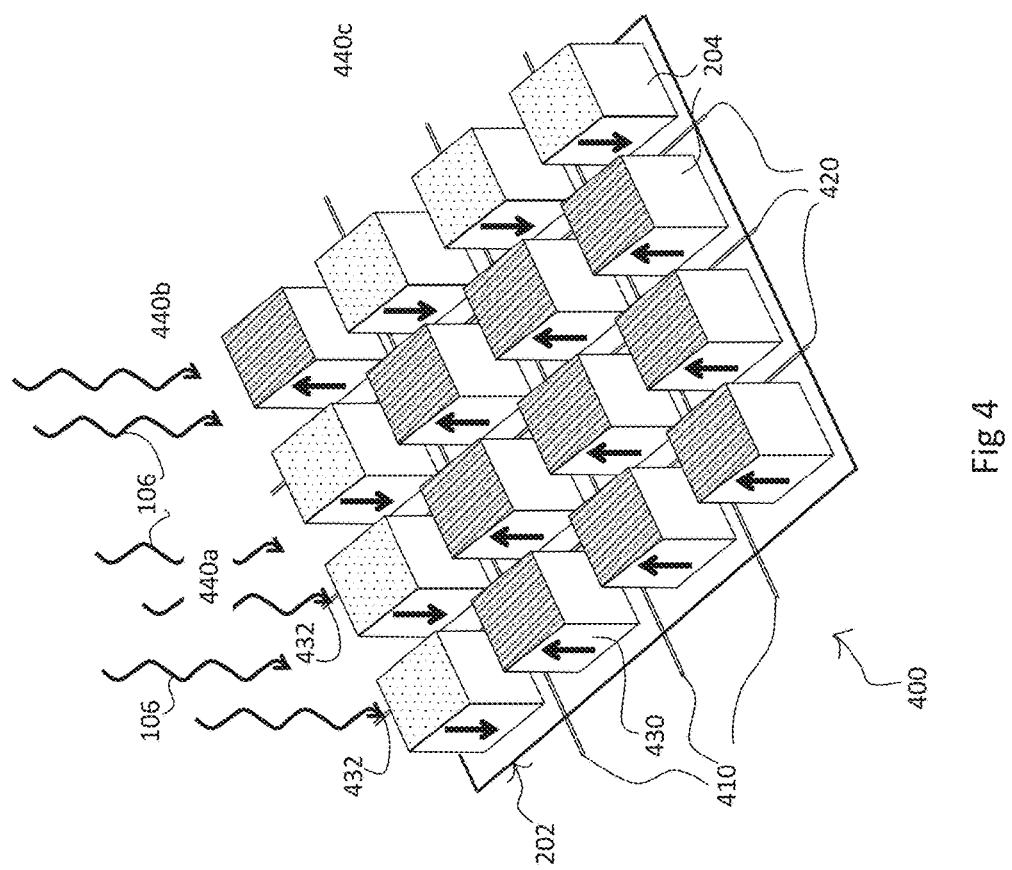
FIG. 4 is a diagrammatic view, in perspective, illustrating an embodiment of a spatial light modulator in accordance with the present disclosure.

The attention of the reader is now directed to FIG. 4 which is a diagrammatic illustration of another embodiment of a spatial light modulator produced in accordance with the present disclosure and generally indicated by the reference number 400. Spatial light modulator 400 can include an array of Faraday domains 204. Addressing lines 410 address, for instance, rows of the Faraday domains, while addressing lines 420 address columns of the Faraday domains. It is noted that the addressing arrangement used with spatial light modulator 400 can appear as identical to addressing arrangement 208 of FIG. 2. In this embodiment, however, the addressing arrangement addresses the Faraday domain array in a way that essentially creates what can be considered as a larger array element 430 for receiving EMW 106 with a portion 432 of EMW 106 incident on addressing lines 410. The larger array element makes up a group of Faraday domains that may be referred to interchangeably throughout this disclosure and the appended claims as an array cell. In the present embodiment, all of the Faraday domains of one 3×3 array cell are shown along with at least one Faraday domain of adjacent array cells. It should be understood that adjacent array cells are indicated by the reference numbers 440a-440c, but are only partially shown due to illustrative constraints. Three of the Faraday domains of each of array cells 440a and 440c are shown, while only one Faraday domain of array cell 440b is shown. It is noted that an arrow on the side of each Faraday domain indicates the direction of magnetization in that domain/element. The shading on the top of each Faraday domain, dark or light, indicates whether the EMW is being blocked or transmitted, respectively. As noted above, any suitable number of Faraday domains can be used to make up an N×N array cell with N being equal to at least 2. Array cells 430 and 440b are set to one magnetization state while array cells 440a and 440c are set to an opposite magnetization state by way of non-limiting example. As brought to light herein, each array cell can pass a wavelength that individual ones of the Faraday domains are incapable of passing. Thus, groups of Faraday domains cooperate to selectively change the polarization of wavelengths that are longer than the wavelength that is associated with the maximum dimensions of an individual Faraday domain.

The foregoing description of the invention has been presented for purposes of illustration and description. Accordingly, the present application is not intended to be exhaustive or to limit the invention to the precise form or forms disclosed, and other embodiments, modifications and variations may be possible in light of the above teachings wherein those of skill in the art will recognize certain modifications, permutations, additions and sub-combinations thereof.

What is claimed is:

1. A spatial light modulator, comprising:
    an array of Faraday domains with each Faraday domain being selectively magnetizable to serve as an individual magnetic domain for selectively changing a polarization state of electromagnetic waves, having wavelengths that are no greater than a maximum wavelength, passing through each Faraday domain with each Faraday domain being characterized by physical dimensions and by a magnetization direction, that is settable to each one of a first direction and a second direction, for changing said polarization state and with each Faraday domain allowed to serve as said individual magnetic domain so long as the physical dimensions do not exceed a given maximum set of dimensions and said maximum wavelength corresponds to said given maximum set of dimensions; and
    an addressing arrangement for addressing the array of Faraday domains to selectively set the magnetization direction of each one of a group of adjacent ones of said Faraday domains to the same one of the first direction and the second direction such that the Faraday domains that make up the group of Faraday domains cooperate to change the polarization state of electromagnetic waves passing therethrough having wavelengths that are longer than said maximum wavelength.

2. The spatial light modulator of claim 1 wherein the addressing arrangement is configured to set the magnetization directions of the Faraday domains that make up the array to produce a series of blocking patterns to support compressive sampling.

3. The spatial light modulator of claim 1 wherein the addressing arrangement is configured to address said array such that said Faraday domains of said groups cooperate to change said polarization states of said electromagnetic waves having wavelengths corresponding to frequencies in the range of frequency from 10 GHz to 10 THz.

4. The spatial light modulator of claim 1 wherein the addressing arrangement is configured to address said array such that said Faraday domains of said groups cooperate to change said polarization states of said electromagnetic waves having wavelengths corresponding to frequencies in the range of frequency from 30 GHz to 300 GHz.

5. The spatial light modulator of claim 1 wherein the group of Faraday domains forms a square shape.

6. The spatial light modulator of claim 1 wherein the Faraday domains are formed from a material that is magnetically stable up to said given maximum set of dimensions but the Faraday domains are otherwise magnetically unstable responsive to the Faraday domains having a size that exceeds the given maximum set of dimensions.

7. A system, comprising:
    the spatial light modulator of claim 1; and
    a polarization analyzer for receiving said electromagnetic waves from the spatial light modulator to transmit one polarization state of the electromagnetic waves that is incident on said group of Faraday domains and to at least partially block an alternate polarization state of the electromagnetic waves that is incident on said group of Faraday domains.

8. The spatial light modulator of claim 1 wherein the physical dimensions of the Faraday domains that make up the array of Faraday domains substantially match the given maximum set of dimensions.

9. The spatial light modulator of claim 1 wherein the addressing arrangement collectively sets the magnetization direction of the each of the Faraday domains that comprise the group.

10. A method for implementing a spatial light modulator, comprising:
    providing an array of Faraday domains with each Faraday domain being selectively magnetizable to serve as an individual magnetic domain for selectively changing a polarization state of electromagnetic waves, having wavelengths that are no greater than a maximum wavelength, passing through each Faraday domain with each Faraday domain being characterized by physical dimensions and by a magnetization direction, that is settable to each one of a first direction and a second direction, for changing said polarization state and with each Faraday domain allowed to serve as said individual magnetic domain so long as the physical dimensions do not exceed a given maximum set of dimensions that corresponds to said maximum wavelength; and
    configuring an addressing arrangement to address the array of Faraday domains to selectively set the magnetization direction of each one of a group of adjacent ones of said Faraday domains to the same one of the first direction and the second direction such that the group of Faraday domains cooperate to change the polarization state of electromagnetic waves passing therethrough having wavelengths that are longer than said maximum wavelength.

11. The method of claim 10 further comprising:
    selectively setting the magnetization directions of the Faraday domains making up the array to produce a series of blocking patterns to support compressive sampling.

12. The method of claim 10 wherein the physical dimensions of the Faraday domains that make up the array of Faraday domains substantially match the given maximum set of dimensions.

13. The method of claim 10 wherein the addressing arrangement collectively sets the magnetization direction of the each of the Faraday domains that comprise the group.

* * * * *